US011824735B1

(12) United States Patent
Prateek et al.

(10) Patent No.: US 11,824,735 B1
(45) Date of Patent: Nov. 21, 2023

(54) HOMOGENEOUS PRE-BUILT ISOLATED COMPUTING STACKS FOR DATA CENTER BUILDS

(71) Applicant: Amazon Technologies, Inc., Seattle, WA (US)

(72) Inventors: Anuj Prateek, Coquitlam (CA); Eric Wei, Seattle, WA (US); Juan-Pierre Longmore, Bellevue, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 51 days.

(21) Appl. No.: 17/708,951

(22) Filed: Mar. 30, 2022

(51) Int. Cl.
*G06F 15/177* (2006.01)
*H04L 41/5041* (2022.01)
*H04L 41/0806* (2022.01)

(52) U.S. Cl.
CPC ...... *H04L 41/5041* (2013.01); *H04L 41/0806* (2013.01)

(58) Field of Classification Search
None
See application file for complete search history.

(56) References Cited

U.S. PATENT DOCUMENTS

| 2007/0233825 | A1* | 10/2007 | Brownell | H04L 67/1001 709/220 |
| 2010/0180016 | A1* | 7/2010 | Bugwadia | H04L 41/0856 713/168 |
| 2012/0123898 | A1* | 5/2012 | Kirkeby | G06Q 30/0631 705/26.7 |
| 2013/0326029 | A1* | 12/2013 | Flynn | H04L 41/0803 709/220 |
| 2014/0122666 | A1* | 5/2014 | Malhotra | G06F 3/0482 709/220 |
| 2016/0057000 | A1* | 2/2016 | Piekarski | H04L 43/10 709/221 |
| 2021/0226861 | A1* | 7/2021 | Barsalou | G06F 9/3836 |

* cited by examiner

*Primary Examiner* — Atta Khan
(74) *Attorney, Agent, or Firm* — Thomas Horstemeyer, LLP

(57) ABSTRACT

For a network service to be deployed in one of a plurality of regional computing stacks, the network service may be partitioned into a region-specific portion and a region-agnostic portion. A first data transfer of the region-agnostic portion of the network service and a second data transfer of the region-specific portion may be performed separate from one another. Configuration settings of the network service as previously deployed in one or more of the regional computing devices may be accessed, and the region-specific portion may be configured using region-specific configuration settings as modified or confirmed by an administrator. The region-specific portion and the region-agnostic portion are deployed in one of the regional computing stacks as part of a networked computing environment.

9 Claims, 7 Drawing Sheets

HOMOGENEOUS PRE-BUILT ISOLATED COMPUTING STACKS FOR DATA CENTER BUILDS

BACKGROUND

Enterprises and other organizations offer network services that are utilized by various computing applications when performing enterprise-related tasks. These network services may include container orchestration and management, data storage, video streaming, machine learning, and "serverless" computing services, as well as other network services, offered using physical and virtual computing resources of one or more data centers. New data centers and other enterprise-related infrastructure, such as fulfillment centers or regional computing centers, are often opened or brought online to account for increasing consumer demand for network services in various geographical regions. However, when a new data center or other facility is opened, network and computing services must be provided to integrate the data center, fulfillment center, or other facility in existing networking and computing infrastructure.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
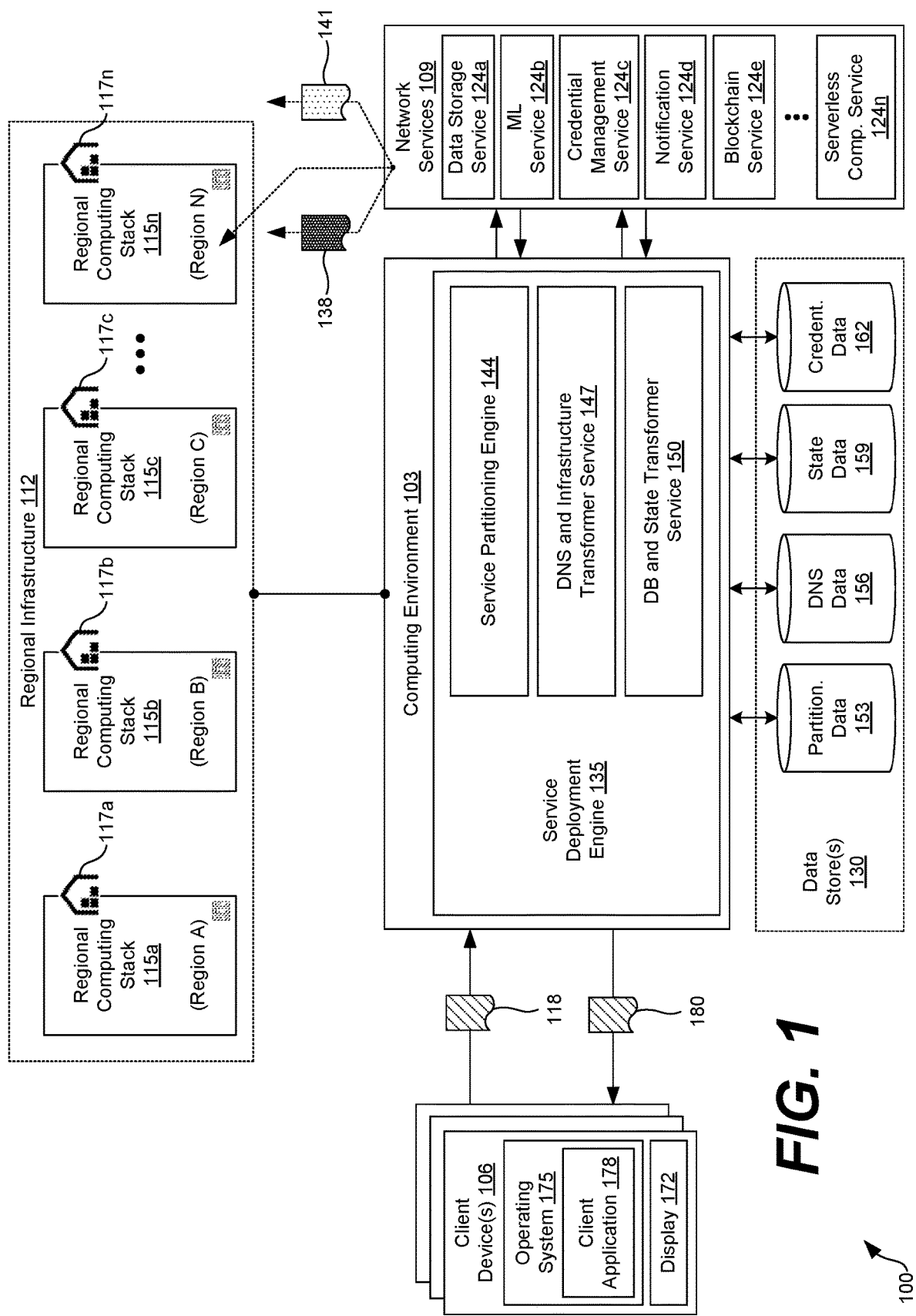
FIG. 1 is a drawing of a networked environment for homogeneous pre-built isolated stacks for data center builds according to various embodiments of the present disclosure.

The present disclosure relates to homogeneous pre-built isolated stacks for data center builds and other like facilities. When a data center or like facility is brought online, the data center is integrated into an existing computing network made up of regional computing stacks where each regional computing stack may serve and respond to requests in a particular region. A network service provider that offers network services to end users and customers may wish to deploy network services in a new region, for instance, to respond to customer demand and to respond to network requests in that particular region. For instance, if a network service provider offers a serverless compute service, the network service provider may deploy an instance of the serverless compute service in a new region to respond to network requests originating in that region.

Network services that are deployed in various regions of a computing network generally do not have varying logic for different regions. Referring to the example above regarding the serverless compute service, a bulk of the source code and other logic of the serverless compute service would be copied to each computing stack in the computing network, which is nearly identical across all regions. However, some variances among the source code, such as settings-related source code and region-specific settings, and corresponding databases may vary among the regions. Variances between configurations of regions (or other granularity) may include domain name system (DNS) settings, database (DB) settings and entries, user account credentials, endpoint settings, optimal region configurations, and so forth. Generally, these variances may be referred to as region-specific data.

When deploying a network service in a new computing region, a setup of the new computing region requires replication of region-specific data using various mechanisms, where region-specific data must be manually coded or modified by developers of a network service to be deployed in a new region. Accordingly, in various embodiments, a computing environment is described having regional isolation of region-specific data where software stacks (e.g., deployments of a network service) are homogeneous across regions. As such, non-stateful software may be bit-replicated in new computing regions, and stateful software may be transformed using bootstrap data.

Prior to the implementation of the various embodiments described herein, deploying a network service in a new region took over a week. However, the embodiments herein achieve significant speed-ups in the deployment of network services in new regions, reducing deployment time from weeks to days and, in some situations, to less than a day. Moreover, unneeded data is not copied, thereby reducing bandwidth and memory usage. Accordingly, the embodiments described herein relate to improvements in the performance of a computing environment as well as improvements in the performance of a networked computing environment.

In the following discussion, a general description of the system and its components is provided, followed by a discussion of the operation of the same.

With reference to FIG. 1, a networked environment 100 is shown according to various embodiments. The networked environment 100 includes a computing environment 103, a client device 106, and various network services 109, which are in data communication with each other via a network. The network may include, for example, the Internet, intranets, extranets, wide area networks (WANs), local area networks (LANs), wired networks, wireless networks, or other suitable networks, etc., or any combination of two or more such networks. Such networks may include satellite networks, cable networks, Ethernet networks, and other types of networks.

The computing environment 103 may include, for example, a server computer or any other system providing computing capability. Alternatively, the computing environment 103 may employ a plurality of computing devices that may be arranged, for example, in one or more server banks or computer banks or other arrangements. Such computing devices may be located in a single installation or may be distributed among many different geographical locations. For example, the computing environment 103 may include a plurality of computing devices that together may form up a hosted computing resource, a grid computing resource, and/or any other distributed computing arrangement. In some cases, the computing environment 103 may correspond to an elastic computing resource where the allotted capacity of processing, network, storage, or other computing-related resources may vary over time.

In instances in which computing devices of the computing environment 103 are distributed in different geographical regions or locations, regional infrastructure 112 together may form up the computing environment 103. For instance, one or more computing devices or other computing infrastructure may form up one or more regional computing stacks 115a . . . 115n (collectively "regional computing stacks 115"). Each of the regional computing stacks 115 may serve a region, such as a country or portion of a country, to account for demand of computing services, provide consumers with various goods, etc. As such, the regional computing stacks 115 may include those physically located in a facility 117a . . . 117n (collectively "facilities 117"), where the facility 117 may include a data center, fulfillment center, warehouses, or other installation as may be appreciated.

In one example, a first regional computing stack 115a may provide electronic commerce-related web services that serve consumers in Japan, whereas a second regional computing stack 115b may provide data storage web services for the Eastern portion of the United States. As such, each regional computing stack 115 may include an instance or other sub-component of a network service 109 to serve that particular region.

In another example, even though the regional computing stacks 115 are distributed geographically, they may work in conjunction to provide a web service accessible from any region of a country or group of countries by performing distributed processing and computing tasks. As may be appreciated, each regional computing stack 115 may include physical computing infrastructure, such as such as servers, memory devices, switches, routers, and other physical computing and networking equipment. To this end, each regional computing stack 115 may operate software and virtual resources on the physical infrastructure to provide various computing services, such as the network services 109, as will be described.

The network services 109 may include web services in some examples that can be invoked using a network service call or an application programming interface (API) call 118 made to an application programming interface of the computing environment 103. A network application programming interface refers to an interface and/or communication protocol between a client device 106 and a server or other remote computing device such that, if the client device 106 makes a request in accordance with a predefined format, the client device 106 would receive a response in a specific format or the server or other remote computing device would initiate a predefined action.

In a cloud provider network context, APIs provide a gateway for customers to access cloud infrastructure by allowing customers, via client devices 106 or other remote computing devices, to obtain data from or cause actions within the cloud provider network, enabling development of applications that interact with resources and services hosted in the cloud provider network. APIs can also enable different services of the cloud provider network to exchange data with one another. The network services 109 may be a portion of the computing environment 103, and may be maintained and/or operated by a common entity. Alternatively, the network services 109 may be independent of the computing environment 103 in some examples, and may be operated by a third-party. In some embodiments, the regional computing stacks 115 may form regional infrastructure 112 for serving up the network services 109.

Figure 2:
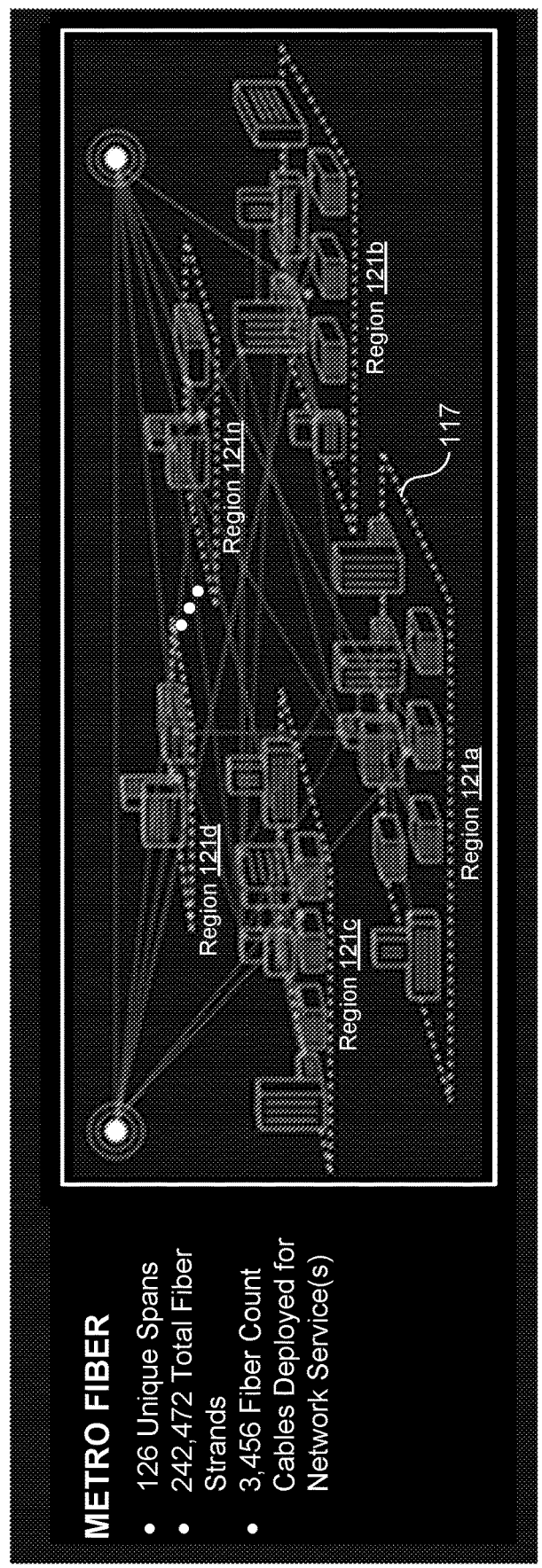
FIG. 2 is an architectural diagram for regions, or cloud regions, offering computing resources in the networked environment of FIG. 1 according to various embodiments of the present disclosure.

The regional infrastructure 112 may be formed as a number of regions, where a region is a geographical area in which a computing provider clusters data centers or other infrastructure. As shown in FIG. 2, a cloud provider network can be formed as a number of regions 121a . . . 121n, where a region 121 is a separate geographical area in which a cloud provider or a network service provider clusters data centers or other facilities 117. Each region 121 may include two or more availability zones (AZs) connected to one another via a private high speed network such as, for example, a fiber communication connection. An availability zone (also termed availability domains or, simply "zones") refers to an isolated failure domain including one or more data center facilities with separate power, separate networking, and/or separate cooling from those in another availability zone.

A data center may refer to a physical building or like facility 117 that houses and provides power and cooling to servers and other computing and networking equipment of the cloud provider network. Availability zones within a region 121 may be positioned far enough away from one other that the same natural disaster would not take more than one availability zone offline at the same time. Customers may connect to availability zones of the cloud provider network via a publicly accessible network (e.g., the Internet, a cellular communication network) by way of a transit center (TC). TCs are the primary backbone locations linking customers to the cloud provider network, and may be collocated at other network provider facilities (e.g., Internet service providers, telecommunications providers) and securely connected (e.g., via a VPN or direct connection) to the availability zones.

Each region 121 may operate two or more TCs for redundancy. Regions 121 may be connected to a global network which includes private networking infrastructure (e.g., fiber connections controlled by the cloud provider) connecting each region 121 to at least one other region 121. The cloud provider network may deliver content from points of presence outside of, but networked with, these regions 121 by way of edge locations and regional edge cache servers. This compartmentalization and geographic distribution of computing hardware enables the cloud provider network to provide low-latency resource access to customers on a global scale with a high degree of fault tolerance and stability.

The cloud provider network may implement various computing resources or services, which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts. When a new region 121 is brought online, it can run its own copies or instances of each desired network service 109.

Referring back to FIG. 1, in accordance with various embodiments, the network services 109 may include a data storage service 124*a*, a machine learning (ML) service 124*b*, a credential management service 124*c*, a notification service 124*d*, a blockchain service 124*e*, a serverless computing service 124*n* (also referred to as a function compute service, on-demand code execution service, functions service, cloud functions service, or functions as a service, in various implementations), a video streaming service, an elastic compute cloud service (also referred to as an elastic compute service, virtual machines service, computing cloud service, compute engine, or cloud compute service in various implementations), as well as other types of network services 109 as can be appreciated.

Various applications and other functionality may be executed in the computing environment 103 according to various embodiments. Also, various data is stored in a data store 130 that is accessible to the computing environment 103. The data store 130 may be representative of a plurality of data stores 130 as can be appreciated. The data stored in the data store 130, for example, is associated with the operation of the various applications and/or functional entities described below.

The components executed on the computing environment 103, for example, include a service deployment engine 135 and other applications, services, processes, systems, engines, or functionality not discussed in detail herein. In various embodiments, the service deployment engine 135 is executed to deploy a network service 109 or, more specifically, an instance or copy thereof, in new regions 121, for instance, as new regions 121 are added or otherwise brought online in the networked environment 100 (or other computing network).

To deploy a new region 121, a bulk of the source code of a network service 109 and other logic would be copied to each regional computing stack 115 in the computing network and executed thereon. As such, each instance of a network service 109 in each regional computing stack 115 may be nearly identical with some variances existing among each instance. In some embodiments, to deploy an instance of a network service 109 in a new region 121, the service deployment engine 135 may identify a region-agnostic portion 138 of the network service 109 as well as a region-specific portion 141 of the network service 109. The region-agnostic portion 138 may be transferred in accordance with a first transfer scheme, such as a bit-replication (e.g., a fast mechanisms of transferring data).

The service deployment engine 135 may include a service partitioning engine 144, a DNS and infrastructure transformer service 147, and a database (DB) and state transformer service 150, among other applications, services, engines, modules, processes, and the like. Specifically, the service partitioning engine 144 may be executed to identify and/or partition a network service 109 into the region-agnostic portion 138 and the region-specific portion 141 using artificial intelligence routines and other data. Accordingly, the region-agnostic portion 138 as generated may include a homogenous service deployed in each of the regional computing stacks 115.

The DNS and infrastructure transformer service 147 may perform transformations on domain name system and other configurations to generate a region-specific portion 141 configured to operate in a new region 121. Likewise, the database and state transformer service 150 may perform transformations on the data store 130 (e.g., database) and other configurations to generate a region-specific portion 141 configured to operate in the new region 121.

Further, the database and state transformer service 150 may be configured to provide data to the region-specific portion 141 of the network service 109 in a stateful manner. For instance, assuming the region-specific portion 141 is stateful, a deployment of the region-specific portion 141 may depend on a current state of the region-specific portion 141. Accordingly, the database and state transformer service 150 may identify a current state of the region-specific portion 141 and provide data adequate to transition the region-specific portion 141 to another state with the intent of deploying in one of the regional computing stacks 115.

In some embodiments, the region-agnostic portion 138 is deployed a first microservice and the region-specific portion 141 is deployed as a multitude of microservices. For instance, assuming variances among the network service 109 include DNS settings, credentials, and the like, a first region-specific microservice may be created to handle DNS settings, a second region-specific microservice may be created to handle credentials, and so forth. Additionally, in some embodiments, the region-specific microservices may be deployed once such that they interact with each homogenous region-agnostic microservice in each regional computing stack 115, avoiding replication of the region-specific microservices while providing region-specific settings to the region-agnostic microservices.

The data stored in the data store 130 includes, for example, partitioning data 153, DNS data 156, state data 159, credentials data 162, among other data. The partitioning data 153 may include logic and other data for identifying a region-agnostic portion 138 and the region-specific portion 141 of a network service 109. In some embodiments, the partitioning data 153 includes variants identified by comparing an instance deployed in one regional computing stack 115 with instances of the same network service 109 deployed in other regions computing stacks 115.

The DNS data 156 may include region-specific nameservers and the like. It is understood that, as a network service 109 is deployed in a region, the nameservers may need to be configured for that particular region. State data 159 may include data pertaining to states of a stateful network service 109*n* or portions thereof. For instance, state data 159 may include a current state of a region-specific portion 141 of a network service 109 being configured to be deployed in a regional computing stack 115. Credential data 162 may include information associated with credentials used by a network service 109 to operate in a regional computing stack 115. In some embodiments, the credential data 162 includes credentials associated with a user account of a development team overseeing operating of the network service 109.

The client device 106 is representative of a plurality of client devices that may be coupled to the network. The client device 106 may include, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client device 106 may include a display 172. The display 172 may include, for example, one or more devices such as liquid crystal display (LCD) displays, gas plasma-based flat panel displays, organic light emitting diode (OLED) displays, electrophoretic ink (E-ink) displays, LCD projectors, or other types of display devices, etc.

The client device 106 may be configured to execute an operating system 175 as well as various applications such as a client application 178 and/or other applications. The client application 178 may be executed in a client device 106, for example, to access network content served up by the computing environment 103 and/or other servers, thereby rendering a user interface on the display 172. To this end, the client application 178 may include, for example, a browser, a dedicated application, etc., and the user interface may include a network page, an application screen, etc. The client device 106 may be configured to execute applications beyond the client application 178 such as, for example, email applications, social networking applications, word processors, spreadsheets, and/or other applications.

Next, a general description of the operation of the various components of the networked environment 100 is provided. An administrator may interact with a client device 106 to notify the service deployment engine 135 of a desire to deploy an instance of a network service 109 in a new region 121 or, in other words, a new regional computing stack 115 to be brought online in the regional infrastructure 112. In the past, a transfer of an entirety of an instance of a network service 109 would be performed manually, requiring an administrator to manually modify code or configuration files of the network service 109 for the new region 121 as installed in a new regional computing stack 115. Alternatively, a copy of an instance of a network service 109 would be made locally and the instance would be configured to the new region 121. Thereafter, the instance of the network service 109 as configured for the new region 121 would be added to a queue for another service team to upload to the new regional computing stack 115.

According to various embodiments, rather than performing a transfer of an entire instance of a network service 109, the service deployment engine 135 may direct the service partitioning engine 144 to identify a region-agnostic portion 138 of the network service 109 as well as a region-specific portion 141 of the network service 109. To this end, in various embodiments, the service partitioning engine 144 may analyze the network service 109 and/or past deployments thereof. For instance, the service partitioning engine 144 may access data of the network service 109 and perform various DIFF operations to identify differences or variants between a deployment of a network service 109 in a first regional computing stack 115a, a deployment of the network service 109 in the second regional computing stack 115b, and so forth. The data accessed and analyzed may include source code of the network service, configuration files, database configurations, database tables, database entries, and the like.

In some embodiments, the service partitioning engine 144 may partition the service into two or more microservices, such as one or more microservices corresponding to the region-specific portion 141 and one or more microservices corresponding to the region-agnostic portion 138. The microservices may be deployed with one another, together forming an instance of a network service 109.

For example, in various embodiments, the region-agnostic portion 138 of a network service 109 may be deployed in each of the regional computing stacks 115, where the region-agnostic portion 138 is a same instance across each of the regional computing stacks 115. A first region-specific microservice may be deployed in each of the regional computing stacks 115 to handle DNS settings, a second region-specific microservice may be deployed in each of the regional computing stacks 115 to handle credentials, and so forth. Alternatively, the first region-specific microservice may be deployed in only one of the regional computing stacks 115 to handle DNS settings, a second region-specific microservice may be deployed in only one of the regional computing stacks 115 to handle credentials, and so forth, for each of the homogenous region-agnostic microservices.

The service deployment engine 135 may perform a transfer (e.g., a first transfer) of the region-agnostic portion 138 of the network service 109 to a new regional computing stack 115. As the region-agnostic portion 138 is the same across regional computing stacks 115, a fast transfer protocol may be performed, such as a bit-replication transfer. In some embodiments, the copy of the region-agnostic portion 138 to a regional computing stack 115 may be performed using a background intelligent transfer service (BITS) protocol.

The service deployment engine 135 may configure the region-specific portion 141 for the new region. To do so, in some embodiments, the service deployment engine 135 may direct various transformations on data accessed from prior deployments of a network service 109 or other data. For instance, the service deployment engine 135 may direct the DNS and infrastructure transformer service 147 to transform DNS settings from one deployment of the network service 109 to another. Similarly, the service deployment engine 135 may direct the database and state transformer service 150 to translate the database and other data settings from one deployment of the network service 109 to another in a stateful manner, for example. Ultimately, region-specific data may be generated which may be provided to the region-specific portion 141 prior to or after the region-specific portion 141 is transferred to the regional computing stack 115 (e.g., a second transfer). When both the region-agnostic portion 138 and the region-specific portion 141 reside in a regional computing stack 115, they may be executed together as an instance of a network service 109.

In some embodiments, the region-specific portion 138 of a network service 109 may execute in each regional computing stack 115; however, in alternative embodiments, the region-specific portion 141 of the network service 109 may execute as a central service (e.g., in a single regional computing stack 115). To that end, if the region-specific portion 141 is executed as a central service, the region-specific portion 141 may maintain state data 159 describing a current state of a network service 109 executing in a region 121 or regional computing stack 115. As such, in some embodiments, a first data transfer of the region-agnostic portion 138 of the network service 109 may copy the region-agnostic portion 138 to various ones (or a subset) of the regional computing stacks 115. The second data transfer of the region-specific portion 141 (e.g., as configured using the region-specific configuration settings) may copy the region-specific portion 141 to a single one of the regional computing stacks 115 to execute as a central service. Each of the regional computing stacks 115 in the subset, or the region-agnostic portions 138 thereof, may be directed to communicate with the region-specific portion 141 as executing as a central service.

In some embodiments, the service deployment engine 135 may perform a series of different types of transformations of data to generate region-specific data and/or to configure a region-specific portion 141 for a region 121. For example, in various embodiments, a transformation of data from a first region 121 to a second region 121 may include a first transformation performed on source code of the network service 109, a second transformation on at least one of a data store 130 associated with the network service 109 and a respective one of the regional computing stacks 115, and a third transformation on data that not conforming to a predetermined pattern. The first transformation may be performed first, the second transformation may be performed second, and the third transformation may be performed third (or last). It is understood that other orders of transformations may be employed.

Figure 3:
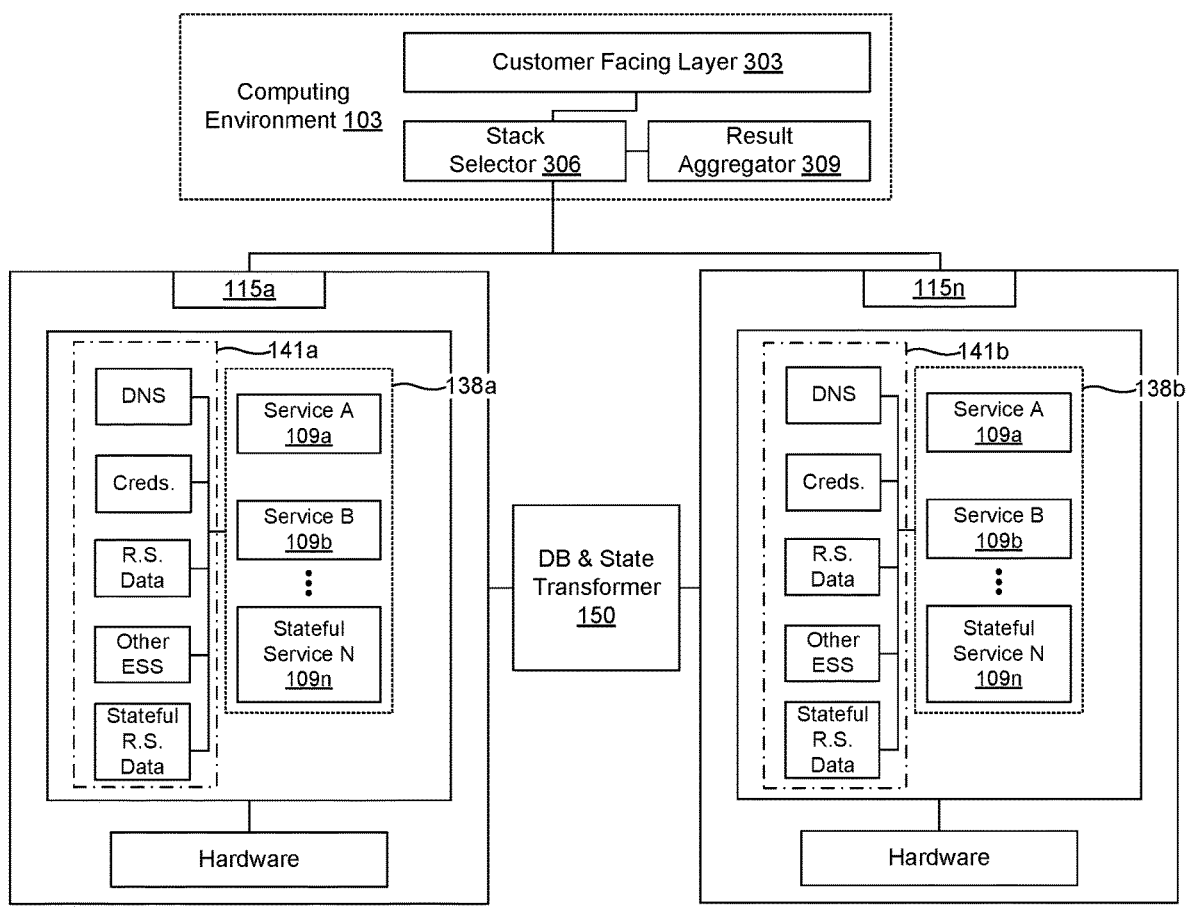
FIG. 3 is a schematic diagram illustrating a deployment of network services in a multitude of regional computing stacks in the networked environment of FIG. 1 according to various embodiments of the present disclosure.

Turning now to FIG. 3, a schematic diagram is shown illustrating a deployment of network services 109a . . . 109n in a multitude of regional computing stacks 115 in the networked environment 100 of FIG. 1 according to various embodiments of the present disclosure. The computing environment 103 may include a customer facing layer 303, which may include an application programming interface layer that interacts with an end user of a network service 109 and/or a developer of the network service 109, for instance, via a client device 106 through one or more API calls 118.

When an API call 118 is received, a stack selector 306 of the computing environment 103 may direct the API call 118 to an appropriate regional computing stack 115 and a respective network service 109 executing thereon. In some embodiments, the stack selector 306 selects a regional computing stack 115 based on a geographic location of the client device 106 initiating an API call 118 as well as a geographic location of the regional computing stack 115. For instance, a most proximate regional computing stack 115 may be identified to respond to an API call 118. A result aggregator 309 of the computing environment 103 may aggregate results of an API call 118 and may provide the results to the requesting device or service.

As shown in representative regional computing stacks 115a, 115n, first network service A 109a, second network service B 109b, and stateful network service N 109n are deployed in a homogenous manner across the regional computing stacks 115. In other words, the region-agnostic portions 138 of each network service 109 is deployed as a service in the regional computing stack 115. Business logic variance and region specific data may be allowed as externally injected configurations. For instance, DNS settings, region credentials, stateful region-specific data, and other data may be deployed as service separate from a network service 109 that are consulted by the network service 109 to deploy region-specific logic. As such, the files may include JSON, XML, and other data files, or may include scripts or source code that is executed by a network service 109 or a region-agnostic portion 138 thereof.

The database and state transformer service 150 may perform transformations of region-specific data, for instance, when a new region 121 is to be deployed. Notably, prior to configuring the region-specific portion 141, the database and state transformer service 150 may transform configuration settings from one regional computing stack 115 to another regional computing stack 115 by replacing configuration values for one of the regional computing stacks 115 with configuration values for the new regional computing stack 115; transforming a data structure from a first format (e.g., XML) to a second different format (e.g., JSON); performing a replacement of data using a regular expression (RegEx); and performing an account-specific transformation, such as associating a new region 121 with a new customer account having a unique set of credentials. Configuration values may include constants, variables values, and so forth, potentially defined in source code, scripts, and the like.

While the service deployment engine 135 may perform transformation of data using patterns (e.g., regular expressions), in some embodiments, the service deployment engine 135 may transform data not matching a predetermined pattern. To this end, in some embodiments, the service deployment engine 135 may perform a locate and replace routine, for instance, to replace values with other region-specific data. In additional embodiments, the service deployment engine 135 may inject bits that don't follow predetermined patterns. For instance, account identifiers may not follow predetermined patterns. However, the service deployment engine 135 may transform a value of an account identifier for a first region 121 with an account identifier of a second region 121. As such, transformations may handle various types of data, not necessarily patterns. In further embodiments, the database and state transformer 150 may change a state of a network service 109 for a first region 121 to a second (and different state) for a second region 121.

While the embodiments of FIG. 3 show region-specific portions 141a, 141b executing in each regional computing stack 115, in alternative embodiments, a region-specific portion 141 may execute as a central service (e.g., in only one regional computing stack 115). To that end, if the region-specific portion 141 is executed as a central service, the region-specific portion 141 may maintain state data 159 describing a current state of a network service 109 executing in a region 121 or regional computing stack 115.

Figure 4:
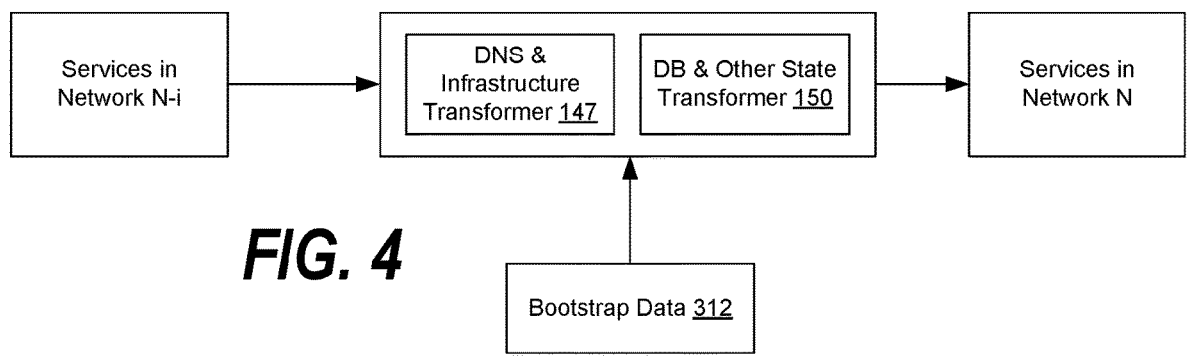
FIG. 4 is a schematic diagram illustrating a deployment of a network service in a regional computing stack in the networked environment of FIG. 1 according to various embodiments of the present disclosure.

Moving along to FIG. 4, a schematic diagram is shown illustrating a deployment of a network service 109 in a regional computing stack 115 in the networked environment 100 of FIG. 1 according to various embodiments of the present disclosure. As noted above, the database and state transformer service 150 and the DNS and infrastructure transformer service 147 may perform transformations of region-specific data, for instance, when a network service 109 is to be deployed in a new region 121. For instance, region-specific data of a network service 109 in a first region 121a may be transformed or translated into region-specific data of the network service 109 for deployment in a second region 121b.

Notably, prior to configuring the region-specific portion 141, the database and state transformer service 150 may transform configuration settings from one regional computing stack 115 to another regional computing stack 115 by replacing configuration values for one of the regional computing stacks 115 with configuration values for the new regional computing stack 115, transforming a data structure from a first format (e.g., JSON) to a second different format (e.g., XML), performing a replacement of data using a regular expression, and performing an account-specific transformation, such as associating a new region 121 with a new customer account having a unique set of credentials.

Additionally, the computing environment 103 may generate bootstrap data 312 for a region-specific portion 141 based at least in part on deployment data identified in association with past or present deployments of the network service 109 in the regional computing stacks 115. The bootstrap data 312 may be presented to an administrator account, via an administrator console, associated with the network service 109. As such, through the administrator console, a confirmation or a modification of the bootstrap data 312 by the administrator account may be received or otherwise identified.

In various embodiments, the bootstrap data 312 may be provided to the region-specific portion 141 of the network service 109 in a stateful manner. For instance, assuming the region-specific portion 141 of the network service 109 is stateful, a deployment of the region-specific portion 141 may depend on a current state of the region-specific portion 141. Accordingly, the database and state transformer service 150 may identify a current state of the region-specific portion 141 and provide bootstrap data 312 adequate to transition the region-specific portion 141 to another state with the intent of deploying in one of the regional computing stacks 115.

Figure 5:
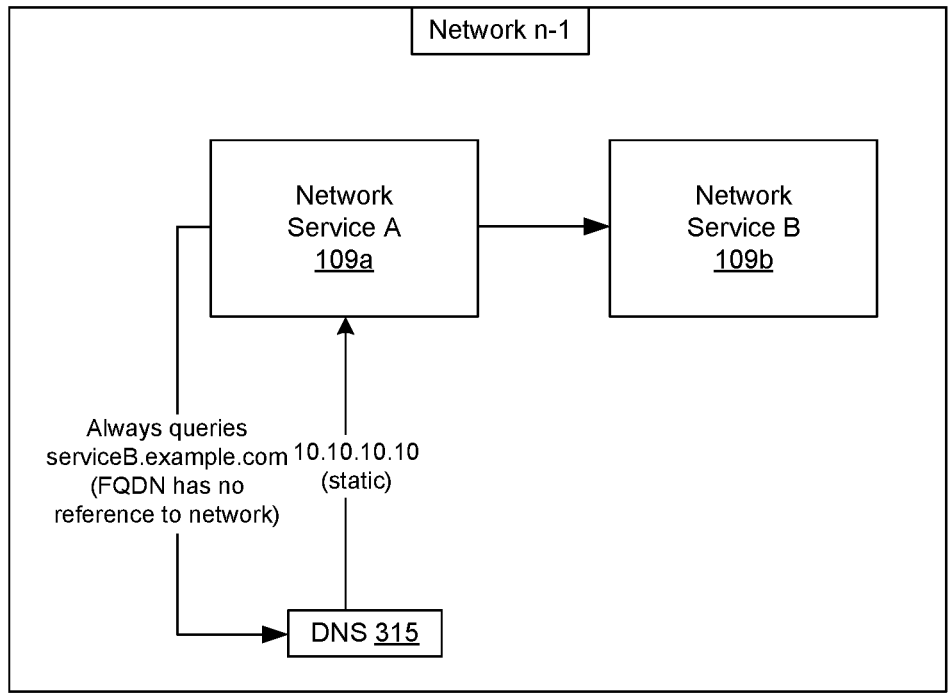
FIG. 5 is a schematic diagram illustrating a deployment of a network service in a regional computing stack in the networked environment of FIG. 1 according to various embodiments of the present disclosure.

Referring next to FIG. 5, a schematic diagram is shown illustrating a deployment of a network service 109 in a regional computing stack 115 in the networked environment 100 of FIG. 1 according to various embodiments of the present disclosure. More specifically, region-agnostic portions 138 of a first network service 109a and a second network service 109b are shown as being partitioned from the network service 109. Region-specific portions 141, such as DNS-related portions, are partitioned or otherwise removed from the network service 109 as a separate DNS service 315. As such, the first network service A 109a may invoke the second network service B 109b by querying the DNS service 315, for example, where the first network service A 109a always queries a predetermined domain (e.g., "serviceB.example.com"). The fully-qualified domain name (FQDN) and/or the DNS service 315 may have no reference to the network of the first network service A 109a or the second network service B 109b, instead returning a static IP address (e.g., 10.10.10.10).

Figure 6:
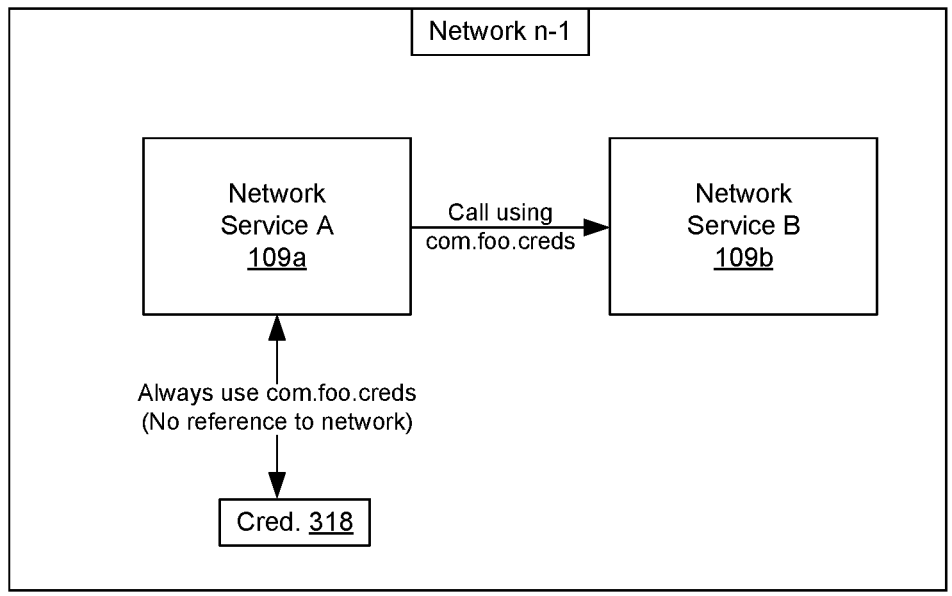
FIG. 6 is a schematic diagram illustrating a deployment of a network service in a regional computing stack in the networked environment of FIG. 1 according to various embodiments of the present disclosure.

Turning next to FIG. 6, a schematic diagram is shown illustrating a deployment of a network service 109 in a regional computing stack 115 in the networked environment 100 of FIG. 1 according to various embodiments of the present disclosure. Similar to FIG. 5, region-agnostic portions 138 of a first network service A 109a and a second network service B 109b are shown as being partitioned from the network service 109. Region-specific portions 141, such as credential-related portions, are partitioned or otherwise removed from the network service 109 as a separate credential service 318. A first network service A 109a may invoke a second network service B by accessing credentials from the credentials service 318, where the first network service A 109a always uses a predetermined domain (e.g., "com.foo.creds") to access the credentials services 315. The credentials service 315 has no reference to the network of the first network service 109a and the second network service B 109b.

Figure 7:
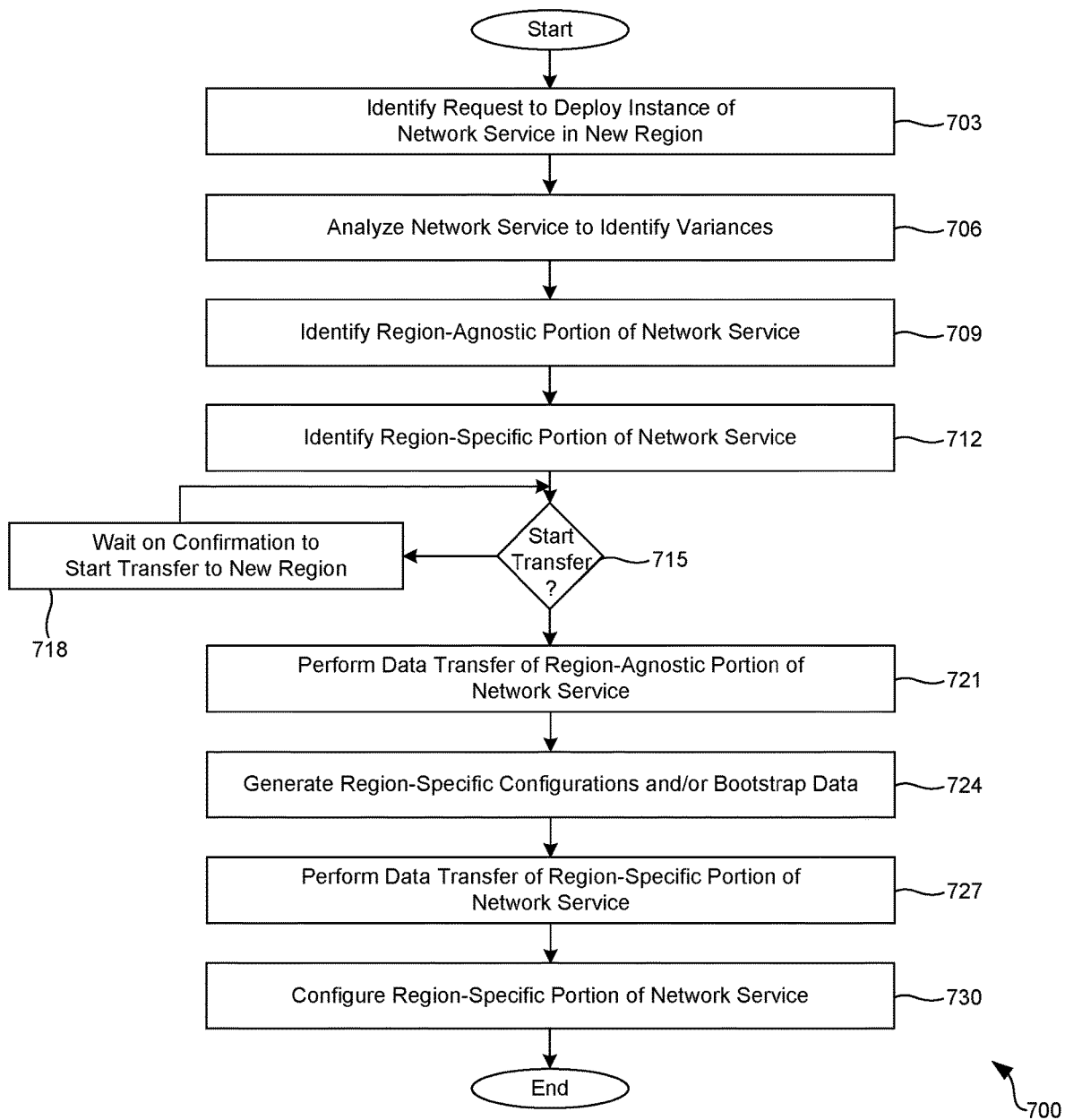
FIG. 7 is a flowchart illustrating one example for providing homogeneous pre-built isolated stacks for data center builds in the networked environment of FIG. 1 according to various embodiments of the present disclosure.

Moving along to FIG. 7, a flowchart 700 is shown that provides one example of the operation of a portion of the service deployment engine 135 according to various embodiments. It is understood that the flowchart of FIG. 7 provides merely an example of the many different types of functional arrangements that may be employed to implement the operation of the portion of the service deployment engine 135 as described herein. As an alternative, the flowchart of FIG. 7 may be viewed as depicting an example of elements of a method implemented in the computing environment 103 according to one or more embodiments.

Beginning with box 703, the service deployment engine 135 may identify a request to deploy an instance of a network service 109 in a new region 121. In some embodiments, an administrator may interact with a client device 106 to notify the service deployment engine 135 of a desire to deploy an instance of a network service 109 in a new region 121 by sending an API call 118 to the service deployment engine 135. To this end, in some embodiments, the service deployment engine 135 may serve up an administrator console that provides service team developers with the ability to create a new region 121, and control a deployment of network services 109 thereon. In various embodiments, prior to deploying an instance of a network service 109 in a new region 121 or regional computing stack 115, when the API call 118 is received, the service deployment engine 135 may begin allocating physical and virtual resources to deploy the network service 109, and may retrieve settings for the new region 121, such as DNS configurations, endpoint settings, internet service protocol (ISP) values, and the like.

According to various embodiments, rather than performing a transfer of an entire instance of a network service 109, the service deployment engine 135 may direct the service partitioning engine 144 to identify a region-agnostic portion 138 of the network service 109 as well as a region-specific portion 141 of the network service 109. Accordingly, in box 706, the service deployment engine 135 may analyze the network service 109 to identify variances among different deployments of the network service 109. For instance, the service deployment engine 135 may analyze past or present deployments of a network service 109 in the regional computing stacks 115 to identify variances between the deployments (or instances) of the network service 109 among the regional computing stacks 115.

For example, the service partitioning engine 144 may access data of the network service 109 and perform various DIFF operations to identify differences or variants between a deployment of a network service 109 in a first regional computing stack 115a, a deployment of the network service 109 in the second regional computing stack 115b, and so forth. The data accessed and analyzed may include source code of the network service, configuration files, database configurations, database tables, database entries, and the like.

In one example, if a portion of source code varies between a first instance of the network service 109 in a first regional computing stack 115a and a second instance of the same network service 109 in a second regional computing stack 115b, a variance will be identified. In another example, if a portion of a database table (e.g., database entries) varies between a first instance of the network service 109 in a first regional computing stack 115a and a second instance of the same network service 109 in a second regional computing stack 115b, another variance will be identified.

In box 709, the service deployment engine 135 may identify a region-agnostic portion 138 of the network service 109. The region-agnostic portion 138 may include a portion of the network service 109 that is the same among different instances in the regional computing stacks 115. In some embodiments, the region-agnostic portion 138 is identified such that the region-agnostic portion 138 is as large a portion of the network service 109 possible while still being independently deployable and/or independently executable (e.g., executable as one or more microservices).

Thereafter, in box 712, the service deployment engine 135 may identify a region-specific portion 141 of the network service 109. The region-specific portion 141 of the network service 109 may include a portion of the network service 109 that includes variances identified in box 706 and/or a portion of the network service 109 readily identifiable as being region-specific, such as a JSON file or XML file containing region-specific configurations.

In box 715, the service deployment engine 135 may determine whether a transfer of the network service 109 to the new region 121 is to be initiated. The transfer of the network service 109, in some embodiments, may be initiated through an administrator console by service team developers or other suitable personnel, which generates a suitable API call 118. The transfer may be disabled or otherwise not accessible until the physical and/or virtual resources are sufficiently allocated for the network service 109 in various embodiments.

If an administrator or another service has not instructed to initiate the transfer of the network service 109, the process may proceed to box 718. In box 718, the service deployment engine 135 may await confirmation to start a transfer of the network service 109 to the new region 121. The process then proceeds back to box 715.

Referring again to box 715, if an indication to start the transfer has been received, the process may proceed to box 721. In box 721, the service deployment engine 135 may perform a data transfer (e.g., a first data transfer) of the region-agnostic portion 138 of the network service 109 to the new region 121 or, more specifically, to a regional computing stack 115 of the new region 121. In some embodiments, the data transfer can include a multitude of transfers to various regional computing stacks 115, for instance, if the network service 109 is to be deployed in a multitude of new regions 121. In various embodiments, the region-agnostic portion 138 may be homogenous or the same across the regional computing stacks 115.

Next, in box 724, the service deployment engine 135 may generate region-specific configurations for the network service 109. To do so, in some embodiments, the service deployment engine 135 may direct various transformations on data accessed from prior deployments of a network service 109 or other data. For instance, the service deployment engine 135 may direct the DNS and infrastructure transformer service 147 to transform DNS settings from one deployment of the network service 109 to another. Similarly, the service deployment engine 135 may direct the database and state transformer service 150 to translate database and other data settings from one deployment of the network service 109 to another in a stateful manner, for example. Region-specific configurations or other settings may be presented to a developer or other personnel via an administrator console, permitting the developer or other personnel to confirm automatically-generated configurations and settings, or to modify the configurations and settings.

In box 727, the service deployment engine 135 may perform a data transfer (e.g., a second data transfer) of the region-specific portion 141 of the network service 109. In box 730, the service deployment engine 135 may configure the region-specific portion 141 of the network service 109 using the region-specific configurations generated in box 724. Alternatively, the region-specific configurations may be used to configure the region-specific portion 141 of the network service 109 prior to the data transfer of box 727 being performed. Ultimately, region-specific data may be generated which may be provided to the region-specific portion 141 prior to or after the region-specific portion 141 is transferred to the regional computing stack 115 (e.g., a second transfer). When both the region-agnostic portion 138 and the region-specific portion 141 reside in a regional computing stack 115, they may be executed together as an instance of a network service 109.

In some embodiments, the service partitioning engine 144 may partition the service into two or more microservices, such as one or more microservices corresponding to the region-specific portion 141 and one or more microservices corresponding to the region-agnostic portion 138. The microservices may be deployed with one another, together forming an instance of a network service 109. Thereafter, the process may proceed to completion.

Figure 8:
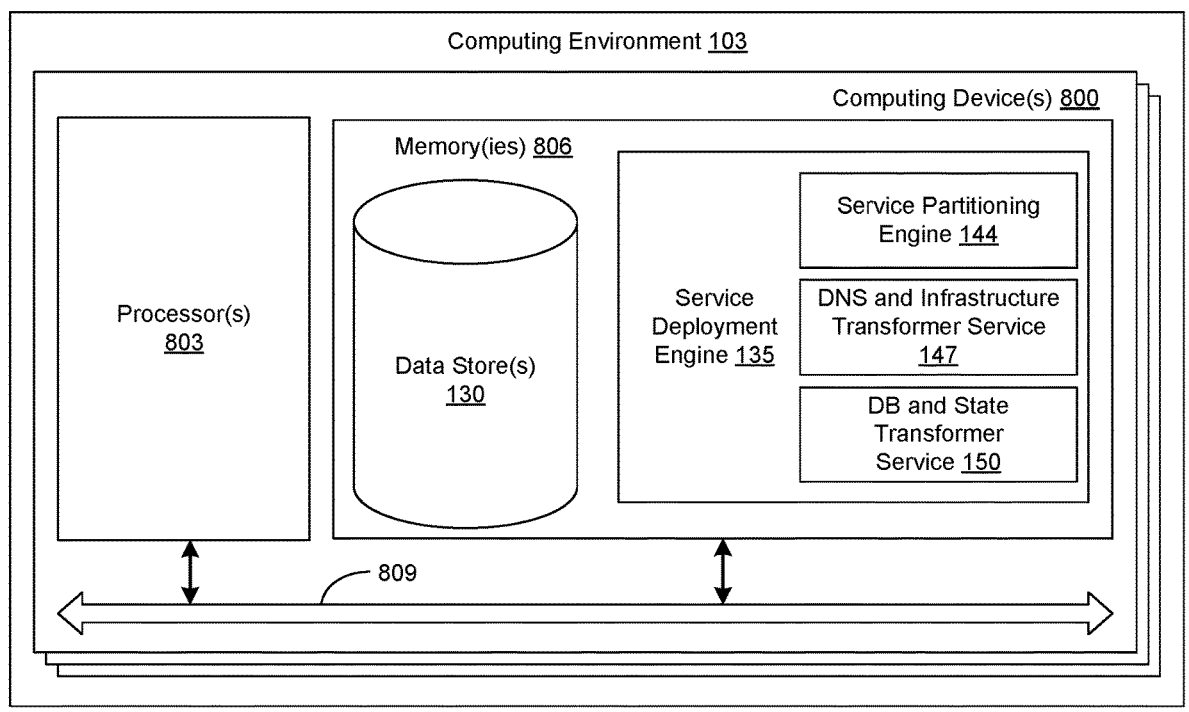
FIG. 8 is a schematic block diagram illustrating a computing environment employed in the networked environment of FIG. 1 according to various embodiments of the present disclosure.

With reference to FIG. 8, a schematic block diagram of the computing environment 103 is shown according to an embodiment of the present disclosure. The computing environment 103 includes one or more computing devices 800. Each computing device 800 includes at least one processor circuit, for example, having a processor 803 and a memory 806, both of which are coupled to a local interface 809. To this end, each computing device 800 may comprise, for example, at least one server computer or like device. The local interface 809 may comprise, for example, a data bus with an accompanying address/control bus or other bus structure as can be appreciated.

Stored in the memory 806 are both data and several components that are executable by the processor 803. In particular, stored in the memory 806 and executable by the processor 803 are the service deployment engine 135, the service partitioning engine 144, the DNS and infrastructure transformer service 147, the database and state transformer service 150, and potentially other applications. Also stored in the memory 806 may be a data store 130 and other data. In addition, an operating system may be stored in the memory 806 and executable by the processor 803.

It is understood that there may be other applications that are stored in the memory 806 and are executable by the processor 803 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 806 and are executable by the processor 803. In this respect, the term "executable" means a program file that is in a form that can ultimately be run by the processor 803. Examples of executable programs may be, for example, a compiled program that can be translated into machine code in a format that can be loaded into a random access portion of the memory 806 and run by the processor 803, source code that may be expressed in proper format such as object code that is capable of being loaded into a random access portion of the memory 806 and executed by the processor 803, or source code that may be interpreted by another executable program to generate instructions in a random access portion of the memory 806 to be executed by the processor 803, etc. An executable program may be stored in any portion or component of the memory 806 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 806 is defined herein as including both volatile and nonvolatile memory and data storage components. Volatile components are those that do not retain data values upon loss of power. Nonvolatile components are those that retain data upon a loss of power. Thus, the memory 806 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 803 may represent multiple processors 803 and/or multiple processor cores and the memory 806 may represent multiple memories 806 that operate in parallel processing circuits, respectively. In such a case, the local interface 809 may be an appropriate network that facilitates communication between any two of the multiple processors 803, between any processor 803 and any of the memories 806, or between any two of the memories 806, etc. The local interface 809 may comprise additional systems designed to coordinate this communication, including, for example, performing load balancing. The processor 803 may be of electrical or of some other available construction.

Although the service deployment engine 135, the service partitioning engine 144, the DNS and infrastructure transformer service 147, the database and state transformer service 150, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 8 shows the functionality and operation of an implementation of portions of the computing environment 103. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 803 in a computer system or other system. The machine code may be converted from the source code, etc. If embodied in hardware, each block may represent a circuit or a number of interconnected circuits to implement the specified logical function(s).

Although the flowchart of FIG. 8 shows a specific order of execution, it is understood that the order of execution may differ from that which is depicted. For example, the order of execution of two or more blocks may be scrambled relative to the order shown. Also, two or more blocks shown in succession in FIGS. 3-8 may be executed concurrently or with partial concurrence. Further, in some embodiments, one or more of the blocks shown in FIG. 8 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the service deployment engine 135, the service partitioning engine 144, the DNS and infrastructure transformer service 147, the database and state transformer service 150, and network services 109, that comprises software or code can be embodied in any non-transitory computer-readable medium for use by or in connection with an instruction execution system such as, for example, a processor 803 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the service deployment engine 135, the service partitioning engine 144, the DNS and infrastructure transformer service 147, the database and state transformer service 150, and network services 109, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 800, or in multiple computing devices in the same computing environment 103. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
at least one computing device;
executable program instructions stored in memory of the at least one computing device that, when executed, direct the at least one computing device to:
analyze a plurality of deployments of a network service in a plurality of regional computing stacks to identify variances between the deployments of the network service among the regional computing stacks, the regional computing stacks together making up a networked computing environment;
determine a region-specific portion of the network service and a region-agnostic portion of the network service based at least in part on the variances;
in response to a new regional computing stack being brought online and added to the regional computing stacks, perform a first data transfer of the region-agnostic portion of the network service;
perform a second data transfer of the region-specific portion as configured according to settings;
access configuration settings of the network service as deployed in another one of the regional computing stacks and perform a transformation on the configuration settings to generate region-specific configuration settings;
configure the region-specific portion using the region-specific configuration settings; and
deploy the region-specific portion and the region-agnostic portion in the new regional computing stack.

2. The system of claim 1, wherein the transformation on the configuration settings comprises at least one of: replacing configuration values for one of the regional computing stacks with configuration values for the new regional computing stack; transforming a data structure from a first format to a second different format; performing a replacement of data using a regular expression; or performing an account-specific transformation.

3. The system of claim 1, wherein the transformation is performed on at least one of a data store associated with the network service, a respective one of the regional computing stacks, or a source code of the network service.

4. A non-transitory, computer-readable medium comprising machine-readable instructions that, when executed by a processor, cause a computing device to at least:
analyze a plurality of deployments of a network service in a plurality of regional computing stacks to identify variances between the deployments of the network service among the regional computing stacks, the regional computing stacks together making up a networked computing environment;
determine a region-specific portion of the network service and a region-agnostic portion of the network service based at least in part on the variances;
in response to a new regional computing stack being brought online and added to the regional computing stacks, perform a first data transfer of the region-agnostic portion of the network service;
perform a second data transfer of the region-specific portion as configured according to settings;
access configuration settings of the network service as deployed in another one of the regional computing stacks and perform a transformation on the configuration settings to generate region-specific configuration settings;
configure the region-specific portion using the region-specific configuration settings; and
deploy the region-specific portion and the region-agnostic portion in the new regional computing stack.

5. The non-transitory, computer-readable medium of claim 4, wherein the transformation on the configuration settings comprises at least one of: replacing configuration values for one of the regional computing stacks with configuration values for the new regional computing stack; transforming a data structure from a first format to a second different format; performing a replacement of data using a regular expression; or performing an account-specific transformation.

6. The non-transitory, computer-readable medium of claim 4, wherein the transformation is performed on at least one of a data store associated with the network service, a respective one of the regional computing stacks, or a source code of the network service.

7. A method, comprising:
analyzing a plurality of deployments of a network service in a plurality of regional computing stacks to identify variances between the deployments of the network service among the regional computing stacks, the regional computing stacks together making up a networked computing environment;
determining a region-specific portion of the network service and a region-agnostic portion of the network service based at least in part on the variances;
in response to a new regional computing stack being brought online and added to the regional computing stacks, performing a first data transfer of the region-agnostic portion of the network service;
performing a second data transfer of the region-specific portion as configured according to settings;
accessing configuration settings of the network service as deployed in another one of the regional computing stacks and perform a transformation on the configuration settings to generate region-specific configuration settings;
configuring the region-specific portion using the region-specific configuration settings; and
deploying the region-specific portion and the region-agnostic portion in the new regional computing stack.

8. The method of claim 7, wherein the transformation on the configuration settings comprises at least one of: replacing configuration values for one of the regional computing stacks with configuration values for the new regional computing stack; transforming a data structure from a first format to a second different format; performing a replacement of data using a regular expression; or performing an account-specific transformation.

9. The method of claim 7, wherein the transformation is performed on at least one of a data store associated with the network service, a respective one of the regional computing stacks, or a source code of the network service.

* * * * *